April 22, 1952  C. A. WASHBURN  2,594,104
LINEAR SWEEP CIRCUITS
Filed Dec. 16, 1943  5 Sheets-Sheet 3

Inventor
CLAYTON A. WASHBURN
By
Attorney

April 22, 1952     C. A. WASHBURN     2,594,104
LINEAR SWEEP CIRCUITS Filed Dec. 16, 1943     5 Sheets-Sheet 4

INVENTOR
CLAYTON A. WASHBURN

April 22, 1952  C. A. WASHBURN  2,594,104
LINEAR SWEEP CIRCUITS

Filed Dec. 16, 1943  5 Sheets-Sheet 5

Inventor
CLAYTON A. WASHBURN

By

Attorney

Patented Apr. 22, 1952

2,594,104

UNITED STATES PATENT OFFICE 2,594,104

LINEAR SWEEP CIRCUITS

Clayton A. Washburn, Westwood, Mass., assignor, by mesne assignments, to the United States of America as represented by the Secretary of the Navy Application December 16, 1943, Serial No. 514,536

23 Claims. (Cl. 250—27)

This invention relates to electronic apparatus such as cathode ray oscilloscopes, television systems, radio direction and ranging systems, and other similar devices which include circuits for generating voltage or current forms that start at a controlled instant and increase linearly or otherwise with time, and which may be caused to recur periodically or otherwise if desired.

In the past, a number of electronic systems have incorporated various circuits for generating voltage or current wave forms which approximate at least in part, linear functions of time. Waves of this type are sometimes called "sawtooth waves." Another term used herein for these wave forms, namely "linear sweep," is appropriate because such wave forms are most commonly used to cause an electron beam to sweep at a linear rate across the screen of a cathode ray tube.

Although in the past some success was obtained in the generation of linear sweep wave forms at low levels or at relatively slow rates of rise or fall, difficulty has been experienced in preserving the linearity of the wave form in the application of the wave to a load or in the amplification of the wave, because of non-linearity of the characteristics of the load or amplifier or both. When it is desired to drive with a linear sweep wave a load that presents a capacitive or inductive reactance, or both, especially when the load is to be driven through a vacuum tube amplifier, the prior circuits are generally found to be unsuitable particularly when an extremely fast sweep of a high degree of linearity and accurately synchronized with a timing pulse and of accurately controllable characteristics is desired. One of the most difficult tasks for a linear sweep circuit to perform is that of driving a precision-timed, fast linear sweep wave of current through a relatively large inductance, such as the magnetic deflecting coils of a cathode ray tube. In such a case, an additional factor that becomes of importance is the distributed and interwinding capacitance of the inductance circuit which must be charged before the sweep starts, if the sweep is to be very linear.

Linear-sweep-forming circuits generally utilize the initial portion of the exponential charge or discharge characteristic of a series resistance-capacitance circuit of the corresponding property of a resistance-inductance circuit, or, broadly stated, the characteristics of a reactive element subjected to a change of energy level. This approximation to a linear time-function of voltage or current when properly employed deviates from true linearity by a small amount, and in such cases constitutes a substantially "linear sweep."

In the past, the best circuits attained linear sweeps with a degree of linearity throughout the sweep rise, or fall, which was limited by and conforming to the shape of a condenser or inductance charge or discharge curve. In cases where large voltage or current changes were required to produce the sweep it was either necessary to tolerate a bending of the sweep voltage rise owing to the shape of the exponential curve or it was necessary to make the charging supply voltage unreasonably high and the time constants of the sweep-forming circuit high to keep the sweep voltage variation on the early portion of an exponential curve.

The present invention permits a wide change in voltage throughout a linear sweep and with exceedingly good linearity by utilizing in effect the very small initial portion of an exponential curve which deviates little from linearity but which is of small voltage or current "swing" and greatly "expanding" this portion to permit a wide voltage variation but with substantially the same degree of linearity. As will be explained this "expanding" or "extending" of the linear first-portion of an exponential variation is accomplished by a special feedback amplification process.

A general object of this invention is to generate a linear sweep of voltage or current synchronized accurately with conditions in related circuits.

Another object of the invention is to provide a method for generating linear sweep voltages or current with precision and rapidity when driving either a complex load or simple load.

An additional object is to provide electronic means for performing a time-voltage (or current) integration which may be used to generate linear saw-tooth waves or other current or voltage time variations.

A more specific object is to provide for a linear sweep which is of large proportions by effectively "expanding" or "extending" the first small portion of an exponential variation to said large proportion having the same quality of linearity as said small portion.

A further object of the invention is to provide means to change the slope of the linear sweep a predetermined amount without appreciable loss of linearity or timing accuracy.

An additional object of the invention is to provide means in cooperation with a linear sweep generating circuit to generate or cause the generation of a substantially square pulse of voltage, the primary purpose of such pulse being to cause the beam of electrons in the cathode ray tube to be shut off except for desired intervals, such intervals commonly being during the application of said linear sweep.

A still further object is to provide means for "blanking" or shutting off the electron beam in a cathode ray tube employing the linear sweep apparatus of the present invention by automatically producing blanking pulses at a time when the electron beam has reached a predetermined position in said tube, the selected end-position of the sweep, regardless of sweep rapidity or repetition rate.

With reference to the figures employed in the description of the invention, Figs. 11 and 11-A illustrate a type of cathode ray tube data presentation in a radar system to which the invention relates.

Figure 1:
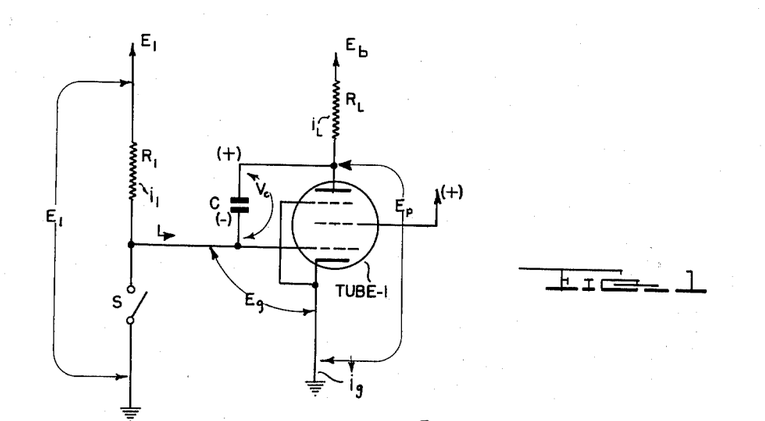
Fig. 1 represents a fundamental embodiment.

The teachings of one phase of the invention may best be understood by reference to Fig. 1. In this figure, amplifying pentode tube 1 has a cathode connected to ground and a plate electrode connected through resistance $R_L$ to a source of potential which is $E_b$ above ground potential. The first grid, or control grid, of tube 1 is connected through condenser C to said plate and also to the junction of switch S and resistor $R_1$. The other side of switch S is connected to ground and the other side of $R_1$ is connected to a source of potential which is $E_1$ above ground potential as indicated. The function of the circuit is to generate a linear sweep voltage at the plate electrode of tube 1 when switch S, normally closed, is suddenly opened. This may be done repeatedly and switch S may assume a number of convenient forms.

To study the basic manner in which the circuit of Fig. 1 operates to perform the above-mentioned function reference will be made to the various voltages, currents and circuit constants. The equation for the plate current in tube 1 may be expressed $$i_p = -G_m E_g \quad (1)$$

where $G_m$ represents the grid-plate transconductance of tube 1.
or $$i_1 = \frac{E_1 - E_g}{R_1} \quad (2)$$

where $i_1$ represents the current through resistor $R_1$. (Note that these relations and the ones to follow represent the variable conditions in parts of the circuit immediately after switch S is opened to the exclusion of D. C. levels). It will further be observed that the plate potential varies as follows:

$$E_p = R_L i_p \quad (3)$$

In practice, $i_1$ is negligible in comparison with $i_L$, hence the tube current may be used instead of current $i_p$. On this assumption $$V_c = E_g - E_p = \frac{1}{C}\int_0^t i_1 dt = \frac{1}{R_1 C}\int_0^t (E_1 - E_g) dt \quad (4)$$

also, $$E_g = -\frac{E_p}{R_L G_m} = -\frac{E_p}{A} \quad (5)$$

Substituting from Equation 5 into Equation 4, $$-E_p\left(\frac{A+1}{A}\right) - \frac{1}{R_1 C A}\int_0^t E_p dt = \frac{1}{R_1 C}\int_0^t E_1 dt \quad (6)$$

Upon examination of the second term in the above equation it will be observed that by keeping the time over which the circuit operates small this term becomes negligible, that is, nearly zero. On this assumption, $$-E_p\left(\frac{A+1}{A}\right) = \frac{1}{R_1 C}\int_0^t E_1 dt \quad (6-a)$$

and the circuit is capable of performing the time integration of $E_1$. In the generation of linear sweep voltages, $E_1$ will be a constant.

To find a convenient form of Equation 6 it may be differentiated, and becomes:

$$E_p + \frac{E_p}{R_1 C(A+1)} = -\frac{A E_1}{R_1 C(A+1)} \quad (7)$$

Keeping $E_1$ constant, $$E_p = E_1 A\left(1 - \epsilon^{-\frac{t}{R_1 C(A+1)}}\right) \quad (7-a)$$

The starting slope of this equation is $$\frac{dE_p}{dt} = -\frac{E_1 A}{R_1 C(A+1)} \quad (8)$$

Employing sweep lengths which are of a very short duration the derivative (or slope) of Equation 7-a is practically constant (Equation 8) because the exponential term is practically unity.

From this expression it may be observed that with the example circuit of Fig. 1 if switch S is suddenly opened the potential at the plate of tube 1 will instantly commence falling at a linear rate with time and will produce a negative linear sweep. The rate of fall, or slope, of this linear sweep will be as shown in the Expression 8.

Figure 2:
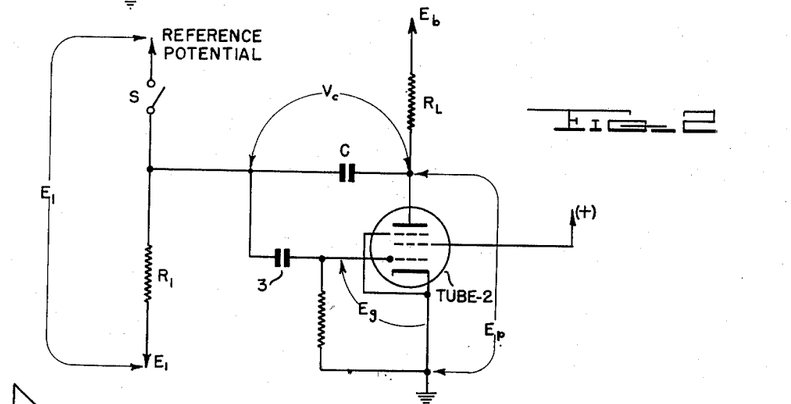
Fig. 2 represents a modification of said embodiment.

Fig. 2 illustrates a modification of the circuit of Fig. 1 and is adapted for producing a positive linear sweep voltage at the plate of tube 2 when switch S is suddenly opened. The only differences observed here are that the relative positions of resistance $R_1$ and switch S are reversed with respect to what they were in Fig. 1. Since the reference potential is a relatively large positive voltage with respect to the potential of the cathode of tube 2 and because switch S is normally closed the grid of tube 2 would thus be at a large positive potential making it desirable that D. C. blocking condenser 3 be provided. Condenser 3 in no way affects the operation of the circuit however since it has negligible impedance to the variations in potential across resistance $R_1$.

The equations for the circuit of Fig. 2 become identical with those for Fig. 1 with the exception that the negative sign in the final expression for the variation in plate voltage of the amplifier tube becomes positive in the case of Fig. 2 indicating a positive linear sweep.

From the analysis of the example circuit of Fig. 1, which applies as well to Fig. 2, it will be observed in the final expression for plate voltage that the linearity of the output linear sweep wave is substantially independent of the gain of the amplifier tube. This is practically true for all types of amplifiers and becomes especially correct for high gain tubes such as pentodes and the like. When making the analysis for triode tubes a slight difference must be considered. That is, the pentode or screen grid tube is essentially a constant current generator, which means that the variations in plate current are substantially independent of plate voltage. The gain of the tube and the control grid voltage only determine the plate current. In triode tubes, however, this is not true and the plate voltage must be accounted for in expressing the equation for plate current. Aside from this the analysis may be made following the route of that made herein for a pentode tube. The substance of the circuit diagrams for the triode analogy will be identical to those of Figs. 1 and 2.

One of the distinctive advantages of this invention is that the negative feedback condenser seen in the circuits of Fig. 1 and Fig. 2, and the remaining circuits to be described, functions as a component of the sweep-forming circuits. That is, its function is to cooperate in forming the linear sweep as well as to transfer the non-linearity in the amplifier tube characteristic from the plate to the control grid, thus making the plate voltage variation substantially linear and the grid potential variations differ from linearity by the deviations from linearity of the tube characteristics.

Figure 3:
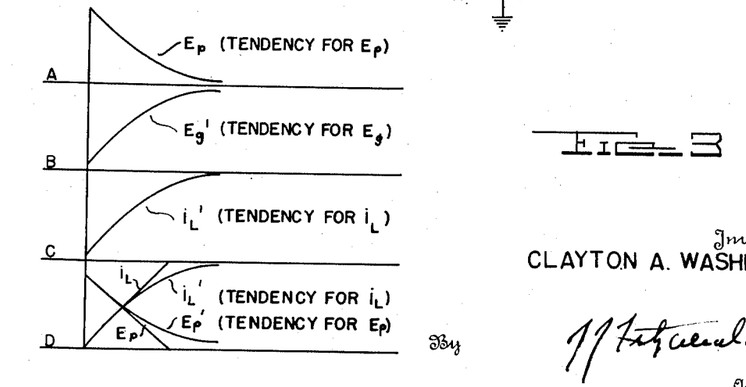
Fig. 3 illustrates a point in the description of such embodiment.

Another method of explaining the manner in which the feedback condenser, also the sweep-forming condenser, functions in cooperation with the remainder of the circuit to produce an exceedingly linear variation in plate potential may be described with reference to Fig. 1. When switch S is closed the lower terminal of condenser C is at ground potential and the upper terminal is at a potential determined by the voltage drop in resistor $R_L$. Both potentials are constant in the initial or quiescent state of the circuit. When switch S is suddenly opened condenser C will tend to discharge through resistance $R_1$, tube 1, and the resistance $R_L$ at a rate determined by the characteristics of the circuit. Initially the charge on condenser C is such that its upper terminal is positive with respect to its lower terminal which is here at ground potential. Thus displacement current $i_1$ through resistor $R_1$ and the condenser C will flow downward through the former and will be a maximum at the start and will tend to fall exponentially to zero as the charge on condenser C becomes accommodated to the new condition in the circuit after the opening of switch S. Fig. 3, which is a voltage-time graph, will serve to illustrate the variations, in currents and voltages existing in the operation of the circuit. At A is shown the manner in which the potential $E_p$ at the plate of the tube 1 would tend to vary if condenser C were not connected to the plate terminal but were connected to a source of constant potential instead, i. e. without the negative feedback existing in the circuit therefrom. Neglecting for the moment the non-linearity of the amplification characteristic of the tube this curve would be an exponential function. At B is plotted a graph of the potential variation at the control grid of the tube were the condenser C connected as just described. This is also an exponential variation. The current through $R_L$ under these conditions would appear as plotted at C. (These three graphs are noted as "tendency" for the respective variables which latter are noted with a "prime" symbol.) However, since condenser C is connected to the plate of tube 1 and not to a source of constant potential as just supposed, the curves for the potential variations will be altered considerably.

It is clear that a linear decay in voltage at the plate of tube 1 would be obtained if $i_L$, the current through resistance $R_L$, would increase linearly with time instead of increasing at a diminishing rate as in C of Fig. 3. Now, with the type of feedback shown, substantially complete feedback through condenser C, the potential variation at the grid of the amplified tube is determined primarily by the potential at the plate electrode since the tube is of a high-gain nature. Further, since the grid tends to rise in potential owing to current through $R_1$ thus causing the plate to tend to fall in potential (at a rate greater than the rate of rise of the grid by a factor equal to the gain of the tube) the negative feedback from plate to grid through condenser C will tend to oppose the rise in grid potential. This will thus have the effect of maintaining constant the discharging rate of condenser C. That is, the time-constant of the $R_1C$ circuit is effectively "extended." A high gain tube particularly enhances this effect of maintaining constant condenser charging current since the rise in grid potential is made negligible compared to $E_1$. Constant current flowing into a condenser causes a linear change in voltage to occur across its terminals. Stated another way, a manner which is not an exact description of the phenomena but which roughly illustrates it, and referring now to D of Fig. 3, as the curve of current $i_L$ tends to curve away from linearity according to the exponential characteristic which the grid potential tends to follow (B of Fig. 3), the potential $E_p$ variation also tends to curve, but in the opposite sense. This would mean that the rate at which voltage is fed back to the grid of tube 1 through condenser C increases with the increasing curvature of plate potential variation. In turn, the rate of change of grid potential would increase causing the rate of change of current flow through the tube to increase thus resulting in a corresponding increase in current through $R_L$.

In summary, the effects of condenser C in the circuit are: (1) formation of sweep voltage, (2) feedback of plate voltage variation from plate to grid of the amplifier tube to oppose discharging rate of condenser C and "extend" the linear portion of such exponential discharge to bring about a highly linear saw-tooth wave at said plate, (3) negative feedback, corrects linear sweep for non-linearity in the amplifier tube characteristic.

Figure 4:
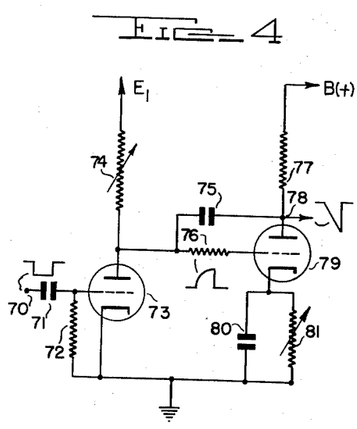
Fig. 4 shows a practical form of Fig. 1 and Fig. 5 does the same regarding Fig. 2.

In practical forms of the circuits of Fig. 1 and Fig. 2 switch S would normally be an electronic device. For instance, the circuits of Fig. 1 and Fig. 2 may take the forms exhibited in Figs. 4 and 5 respectively. In both Figs. 4 and 5 triode tubes are shown for the sweep amplifiers but this does not alter the fundamental considerations. In Fig. 4 tube 73 acts as an electronic switch. The tube is normally conducting and the potential at its plate terminal is at a constant level above ground potential. Upon the application of a negative rectangular pulse of voltage to the grid of tube 73 through condenser 71 the plate current will be immediately stopped for the duration of such negative pulse. This has the effect of opening switch S in Fig. 1. The time-constant of resistor 74 and condenser 75, and $E_1$ (in Fig. 4 $E_1=B+$), primarily determine the slope of the linear sweep voltage appearing at the plate of the tube 79, or point 78, which is the output terminal of the circuit. Variable resistance 81 in combination with condenser 80 provide cathode bias for tube 79 in a known manner. Again, condenser 75 serves both as a component in the sweep-forming circuit and as a negative feedback condenser from the plate of tube 79 to its grid. Tube 79 may be near cut-off normally. Upon application of the negative pulse to the grid of tube 73 the potential at point 78, the plate of tube 79, commences falling.

Figure 5:
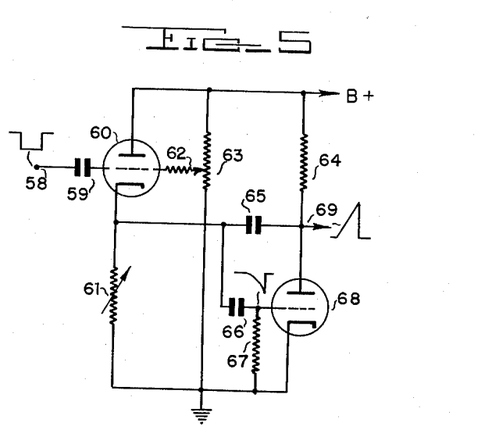

In Fig. 5, tube 60 now becomes the electronic switch which is operated by a negative square pulse applied to point 58. The time-constant of variable resistor 61 and condenser 65 and the input potential $E_1$ primarily determine the slope of the positive saw-tooth voltage wave appearing at point 69 the plate terminal of tube 68. Potentiometer 63 determines the potential $E_1$ (Equation 8) across $R_1$ (resistor 61). Here the termination of the negative saw-tooth may be brought about by one of two conditions being reached in the circuit, (1) the negative square pulse applied to the grid of tube 60 terminates, or (2) the potential at the cathode of tube 60 falls to substantially the potential at the grid at which point the tube will commence conducting.

Figure 6:
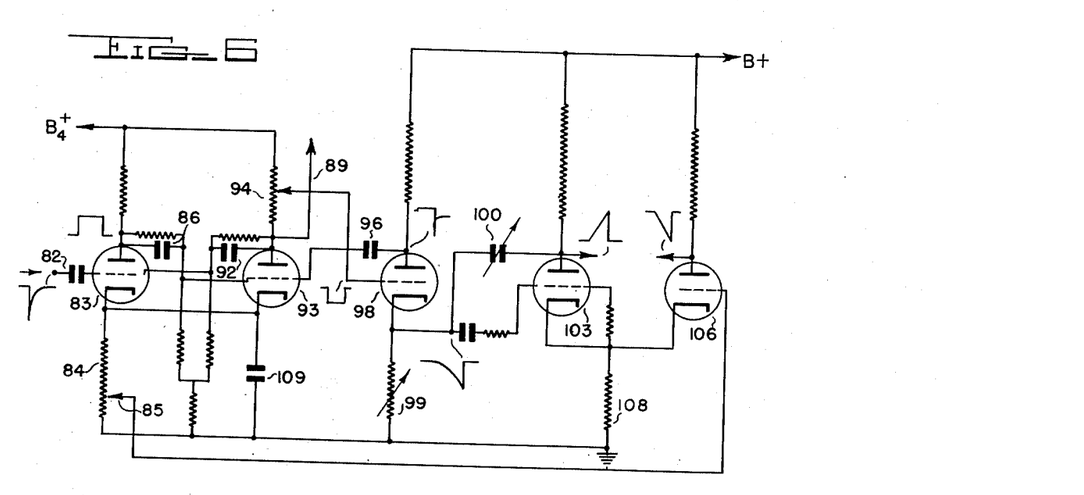
Figs. 6 and 7 illustrate practical sweep-generating and cathode ray beam control circuits in accordance with the teachings of the invention.
Figure 7:
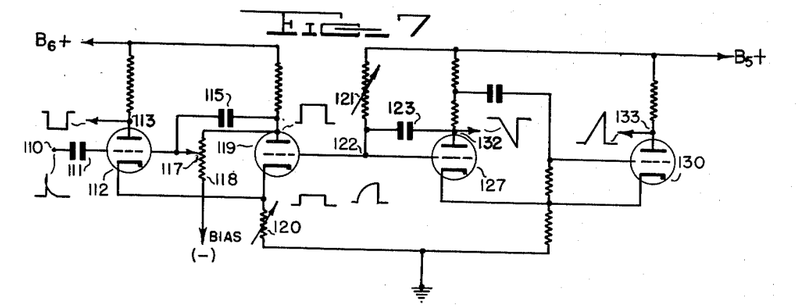

As a further feature of the invention the principles of the circuits illustrated in Figs. 1 and 2 along with 4 and 5 have been extended to the arrangements illustrated in Figs. 6 and 7. These latter circuits are designed to be the complete driving and "blanking" circuits for electrostatic cathode ray tube indicators such as would be employed in radar systems. That is, the circuits are adapted for producing linear sweep voltages of selectable slope and synchronized accurately with given trigger voltage impulses, and for producing accurately synchronized blanking voltages for the electron beam in cathode ray tubes. The linear sweep voltages are here produced in push-pull form and are of a predetermined selectable length, another feature of the invention. Their operation will be described in detail subsequently but it will be noted that a novel feature of both of these circuits is that provision is made to automatically turn on the electron beam of a cathode ray tube at the inception of each sweep and to turn it off at a predetermined period during each linear sweep, i. e. when the sweep voltage reaches a given fixed amplitude. This insures that the sweep trace on the indicator tube screen will be of a consistent length regardless of the slope of the saw-tooth wave or its repetition frequency.

With reference to Fig. 6, tubes 83 and 93 are connected in a triggered gate generating circuit. Tube 98 performs as the switching device for the sweep-forming circuit of which tube 103 is the sweep-forming amplifier. The arrangement of the portion of the circuit involving the sweep generation, and including tubes 98 and 103, is similar to that described in Figs. 2 and 4. Tube 105 is operated as an inverting amplifier stage and produces at its plate electrode saw-tooth waves substantially of the same form as those produced at the plate electrode of tube 103 but of opposite polarity. The plate electrodes of tube 103 and 106 may be connected to opposite deflecting plates of a cathode ray tube indicator for producing a linear sweep therein in push-pull fashion. The advantage of using push-pull sweep voltages is primarily that the average deflecting plate potential remains constant. This eliminates the tendency for the electron beam to de-focus when passing through the deflecting field. A secondary advantage is that each of the waves need be generated at but one half the magnitude required if a "single-ended" deflecting voltage were applied to one deflecting plate, the other plate remaining at constant potential.

In the operation of the circuit in Fig. 6, repeating negative impulses of voltage are applied through condenser 82 to the grid of tube 83 in the gate generating circuit. In consequence of the triggered response of the gate circuit and the constants thereof a gate or negative square voltage pulse is developed across resistor 94. An adjustable tap on this resistor provides for obtaining a selectable portion of this pulse for application to the grid of switch tube 98. The normal flow of current in tube 98 is instantly terminated by the initiation of said pulse. In a manner characteristic of the sweep circuit and which was previously described, a positive linear sweep appears at the plate of tube 103, and a negative linear sweep appears at the plate of 106 by the inverting action. Condenser 100 and resistor 99 may be adjusted to determine the slope of the sweep voltages while the former provides negative feedback to the grid of tube 103 as well.

The termination of the sweep is brought about as a function of sweep amplitude. As the potential at the plate of tube 103 rises linearly, that at the cathode of tube 98 (as the grid of tube 103) falls, but at a much-reduced rate because of tube gain. When the cathode potential of tube 98 falls to a point where it is approximately equal to the potential at the grid electrode, the latter potential remaining approximately constant during the negative pulse, tube 98 immediately conducts and the sweep voltages terminate. Functionally, tubes 98 and 93 form a multivibrator. By adjusting the position of the variable position tap of potentiometer 94 the amplitude of the negative square voltage pulse at the grid of tube 98 may be adjusted, hence controlling the amplitude of the linear sweep voltages generated by the circuit. With well regulated voltage supplies repeating linear sweep voltages of unvarying amplitude may be obtained from the apparatus and will be substantially independent of other characteristics of such sweeps. The gate circuit generates a gate which is terminated only when tube 98 becomes conducting.

Potentiometer 84 with adjustable contact 85 and located in the cathode circuit of tube 83 is by-passed by condenser 109. Contactor 85 is connected to the grid of 106 and provides a substantially constant bias for this tube permitting the potential at the plate of tube 106 to fall at the same rate as the rate of rise of potential at the plate of tube 103.

Centering of the sweeps on the cathode ray tube, i. e. adjusting the initial and final potential of the saw-tooth voltage wave at the anodes of tubes 103 and 106 and deflecting plates of the cathode ray tube may be accomplished in several ways. By adjusting the position of contact 85 on potentiometer 84 the potential applied to the grid of tube 106 is adjusted determining the amount of plate current in tube 106 during the quiescent periods, that is before the saw-tooth sweeps commence. In turn, the current conducted by tube 106 produces a corresponding voltage drop in resistor 108, which is common to the cathodes of tubes 103 and 106, biasing tube 103. Thus the initial position of the spot on the cathode ray tube as produced by the electron beam may be adjusted by varying contactor 85. As has been mentioned the amplitude of the sweep voltages is determined by the adjustment of the contactor of potentiometer 94.

In considering the operation of Fig. 6 in the generation of blanking pulses for the cathode ray tube indicator, or, what is the same, generating suitable sensitizing pulses which are adapted to turn on the electron beam in the cathode ray tube during the existence of the linear sweep therein, a connection 89 may be made from the plate of tube 93 to the cathode of the cathode ray tube. It has been mentioned that the constants of the pulse generating circuit comprising tube 83 and 93 are such that the negative square pulse appearing at the plate of tube 93 tends to be long enough causing the linear sweeps to be terminated by the effect of the falling potential at the cathode of tube 98 reaching the potential at the grid thereof. Actually, however, when the saw-tooth wave terminates by the sudden conduction of tube 98 the negative square pulse is automatically terminated also. This is accomplished by the rapid discharge of condenser 96 when tube 98 suddenly conducts. This discharge of condenser 96 triggers off tube 93, and the square pulse at the plate of tube 93 is terminated. As mentioned, connection 89 may be applied to the cathode of the cathode ray tube to turn on the electron beam during the existence of the saw-tooth wave. Alternatively, the plate of tube 83, which produces a positive square pulse of the same duration as the negative square pulse of the plate of tube 93, may be connected to the control grid of the cathode ray tube to produce the same effect.

Fig. 7 illustrates another form of the invention similar in some respects to that of Fig. 6 but simpler in construction. In this arrangement tubes 112 and 119 are connected in a pulse generating circuit which is triggered periodically by a positive impulse of voltage applied to point 110, hence through condenser 111 to the grid of tube 112. Tube 119 also acts as the switching device of the sweep generating circuit. Tube 127 is the sweep amplifier and condenser 123 is the sweep and feedback condenser as before. Tube 130 inverts the negative saw-tooth wave generated at the plate of tube 127, or point 132, and produces a positive saw-tooth wave at point 133. A negative square voltage pulse is generated at the plate of tube 112, or point 113, and a positive square pulse of voltage at the plate of tube 119, both being of a duration equal to the length of the saw-tooth wave as will be explained. The negative square pulse appearing at the plate of tube 112 may be applied to the cathode of the cathode ray tube indicator to turn on the electron beam during the existence of the linear sweep.

In the operation of the circuit of Fig. 7, the positive square pulse at the plate of tube 119 is initiated by the positive trigger impulse applied to the grid of the tube 112. Tube 119 is normally conducting and passes a certain grid current through resistor 121, thus placing point 122, or the grid of tube 127, at a fixed potential. Such potential places tube 127 in a condition where it is normally only slightly conducting. As tube 112 commences conducting at the advent of the positive square pulse at its grid the potential at the commonly connected cathodes of the two tubes, 112 and 119, rises by virtue of the increased current through resistor 129. This changes the effective bias on tube 119 and decreases its current flow causing the potential at its plate to rise suddenly, which rise is in turn coupled back through condenser 115 to the grid of tube 112 increasing the current in the latter still further. Hence, in trigger circuit fashion tube 119 is cut-off, which tends to cause point 122 to suddenly rise in potential. This it cannot do because of the charge on condenser 123. As a result, a linear saw-tooth wave is produced at the plate of tube 127 essentially according to the teachings of the device of Fig. 1.

During the generation of the linear sweep voltages the potential at point 122 rises at a rate somewhat less than linearly. The potential at the cathode of tube 119 remains substantially constant for the duration of the positive square pulse. The rising potential at point 122 will reach a critical point where tube 119 will again commence to conduct, thus terminating the square voltage pulse and the linear sweep. Thus, the sweep length and pulse length, as in Fig. 6, are here a function of sweep amplitude also.

In regards to centering the sweep on the cathode ray tube screen, the initial deflection of the electron beam, or the starting point of each linear sweep, is determined by the quiescent conducting conditions of tubes 127 and 130, which in turn may be adjusted by resistor 120. The bias of tube 119 depends upon the setting of variable resistor 120 which therefore controls the amount of grid current drawn through resistor 121. Since the normal bias of tube 127 is determined by the current through resistor 121 the initial currents in tubes 127 and 130 are determined by the magnitude of resistor 120. Potentiometer 118 with adjustable contactor 117 determines the magnitude of the linear sweep voltages. That is, by moving contact 117 nearer the potential at the plate of tube 119, the magnitude of the positive voltage pulse at the cathode of tube 119 is increased. Thus the rising potential at point 122 during the linear sweep must reach a higher value before tube 119 will conduct terminating the sweep and square pulse.

Both in Figs. 6 and 7 the square pulse generating circuits are of the triggered types. They need not be, however, but may be free-running multivibrators for instance. The reason for showing them as triggered circuits is that the most useful application of the precision sweep circuits of the present invention is in radar systems, and in this application the sweep traces on the cathode ray tube indicator must commence simultaneously with the transmission of a pulse from the radar transmitter in order that range to reflecting objects may be measured accurately on the cathode ray indicator.

It is a well-known fact that the voltage wave necessary to drive a linear sweep current through an inductance coil will be trapezoidal in shape. For instance, in Fig. 8, if the graph of current-versus-time represents a linear saw-tooth of current through an inductance coil then the voltage necessary to produce this current must be of the form shown directly above in the voltage graph. The slope of the two waves are proportional. The voltage wave has an initial step $e_a$ and falls linearly with time to a value $e_b$, returning to zero. The current wave starts from zero and falls linearly with time at a rate proportional to the rate of fall of the trapezoidal voltage wave and reaches a final value which is proportional to the difference between the final and initial values of the voltage wave. The magnitude of the initial step voltage $e_a$ required is determined by the characteristics of the inductance coil. The deflection coils of magnetic cathode ray tubes are a common example of these principles.

Figures 8, 9, 10:
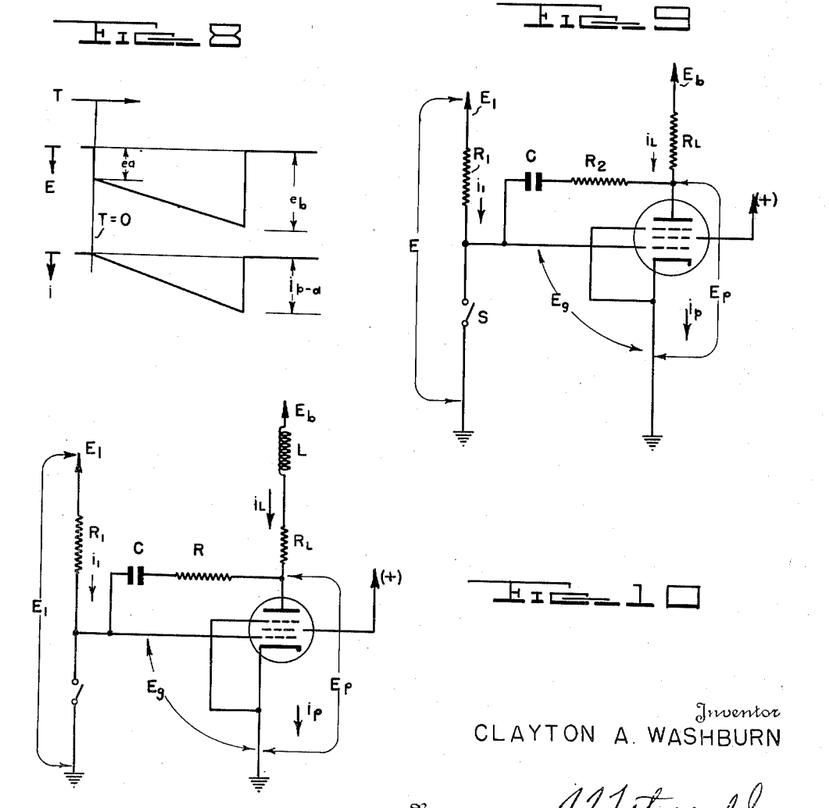
Fig. 9 illustrates another basic feature of the invention and Fig. 8 is an aid to the description of Fig. 9.
Fig. 10 is a modification of Fig. 9.

The present invention is readily adapted to the generation of trapezoidal voltage waves for driving linear sweep currents through inductance coils. Fig. 9 illustrates a means of accomplishing this. The circuit is exactly similar to that of Fig. 1 with the exception of an additional resistor $R_2$ placed in the feedback connection. To illustrate the manner in which this arrangement operates to produce a trapezoidal wave at the plate of the pentode amplifier tube the reasonable assumption will be made that the series combination of $R_1$, $C$, and $R_2$ is large enough that the current drain through that portion of the circuit is negligible. That is, that changes in $i_1$ due to changes in $E_g$ may be neglected in altering the current flow through resistance $R_L$. Under this assumption it may be shown that the plate voltage $E_p$ confirms to the following expression when switch S is suddenly opened, $$E_p = -\left[\frac{R_2 E_1 A}{R_1(A+1)} + \frac{E_1 A}{R_1 C(A+1)} \cdot t\right] \quad (9)$$

The first term of the expression represents the initial voltage step or $e_a$ of the Fig. 8, while the coefficient of the time variable, $t$, represents the slope of the trapezoidal wave. It is thus seen that $R_2$ introduces the desired step function in the voltage wave occurring at the plate of the amplifier tube.

Referring to Fig. 1 for the moment, it will be observed that to obtain a saw-tooth wave of voltage at the plate of tube 1 it is necessary that a saw-tooth wave of current flow through resistor $R_L$, $E_b$ being substantially constant. Comparing this phenomenon with the teachings of Fig. 9 an inductance coil, such as the deflection coil of a magnetic cathode ray tube, is placed in series with the resistor $R_L$ to produce a linear saw-tooth of current through the inductance coil. Fig. 10 illustrates this arrangement. By making the same assumptions as were made in connection with Fig. 9 the following may be said of the relations in the circuit of Fig. 10.

$$i_p = G_m \cdot E_g \quad (10)$$

$$-E_p = R_L G_m E_g + L G_m \frac{dE_g}{dt} \quad (11)$$

$$i_1 \cong \frac{E_1}{R_1} \quad (12)$$

$$-E_p + E_g = \frac{1}{C}\int \frac{E_1}{R_1} dt + \frac{R_2}{R_1} E_1 \quad (13)$$

and $$E_p = L\frac{di}{dt} + R_L i$$

When these equations are solved simultaneously the following expression for the conditions in the circuit after the switch S is opened is obtained, $$-\frac{(R_L G_m + 1)}{G_m} \cdot i_L - L\frac{di_L}{dt} = \frac{E_1}{R_1 C} \cdot t + \frac{R_2 E_1}{R_1} \quad (14)$$

If the current through the coil L is to be a linear function of time then $E_p$ or the voltage across the coil must consist of two components as follows, (1) $R_L(G_m E_g) = K_1 t \quad (15)$ (2) $L\left(G_m \frac{dE_g}{dt}\right) = K_2 \quad (16)$ hence, equating terms of equal order in (14), $$i_L = \frac{G_m E_1 \cdot t}{R_1 C(R_L G_m + 1)}$$

from which, $$\frac{di_L}{dt} = \frac{G_m E_1}{R_1 C(R_L G_m + 1)} = \frac{E_1}{R_1 C R_L}\left(\frac{R_L G_m}{R_L G_m + 1}\right) \quad (17)$$

and $$\frac{di_L}{dt} = \frac{R_2 E_1}{R_1 L} \quad (18)$$

Equating 17 and 18, and for the case where the gain of the tube is high then, $$CR_2 = \frac{L}{R_L} \quad (19)$$

It is to be noted that if the gain of the tube is high, again, that one may make the following very close approximation, $$\frac{i_L}{t} = \frac{E_1}{R_1 C R_L} \quad (20)$$

from these latter considerations, i. e. the last two Expresions 19 and 20, which must be true to satisfy the conditions in the circuit for a linear current sweep through coil L, it may be observed that the sweep amplitude may be varied by changing either $E_1$ or $R_1$ without detriment to the saw-tooth linearity.

This circuit, it will be observed, becomes extremely useful in applications where it is desired to modulate the slopes of the repeating saw-tooth waves. For instance, by varying the magnitude of $E_1$ at a predetermined rate, preferably slow compared to the frequency of the repeating sweeps, the slopes of the successive saw-tooth waves of current generated by the circuit in the inductance L may be varied accordingly. Reference is made particularly to a form of radar indication known as PPI (plan position indication), where the sweep traces on the cathode ray tube indicator commence from the center of the tube and extend radially outward. The sweep position rotates about the center of the tube at a predetermined angular rate, said rotation being accomplished by applying saw-tooth sweep voltages to the vertical and horizontal deflection plate from two separate sweep circuits which are amplitude modulated sinusoidally and cosinusoidally respectively, at the frequency of the modulating wave corresponding to the frequency of rotation of the radially extending sweeps. In such an application sinusoidal variations in $E_1$ may be obtained by means of a sinusoidally-wound potentiometer having its winding terminals connected across a constant voltage and a rotatable contact for supplying $E_1$. Such potentiometers are known to the art.

It will further be noted in connection with Fig. 10, however, that if it is desirable to obtain saw-tooth waves of selectable slopes and over a wide range, that both $R_L$ and $R_2$ are preferably varied together such that their product is kept constant.

The description of the invention and several features thereof thus far has been limited to the case where linear saw-tooth waves of current or voltage have been desired. A study of the equations relating to the circuit of Fig. 1, for instance, will reveal the fact that the variation in plate voltage is actually the time integral of the voltage $E_1$ (see Equation 7). Clearly the invention is thus very broad in the sense that it provides for the integration of any given voltage or current wave. That is, with $E_1$ a given function of time, $E_p$ in the circuits of Figs. 1 or 2 and others will be the integrated function of $E_1$. This feature becomes particularly useful where it is desired to provide accurately generated non-linear sweeps of a given nature. For example, an airplane carrying a radar system adapted for producing an image on the cathode ray tube of the terrain below would require a sweep generating circuit capable of producing a parabolic sweep rather than a linear sweep if an undistorted map is to be presented. Specifically, a parabolic sweep may be generated by applying a linear sweep to the $E_1$ terminal of the circuit. Other examples may readily be drawn. One of the salient features of the invention may be described in connection with Fig. 11. Said figure shows a form of indication very common to radar systems, especially of the airborne type, which has in the past presented a very difficult problem in the design of a suitable sweep generating circuit. The problem is one of driving an extremely fast linear current sweep through a magnetic cathode ray tube deflecting coil, with the additional requirements that provision be made for automatically switching the electron beam on and off according to the time of existence of the sweep, and facility in centering of the sweeps on the screen of the tube. These requirements have all been met satisfactorily in the circuit of Fig. 12 which will be described later.

Figures 11, 11A:
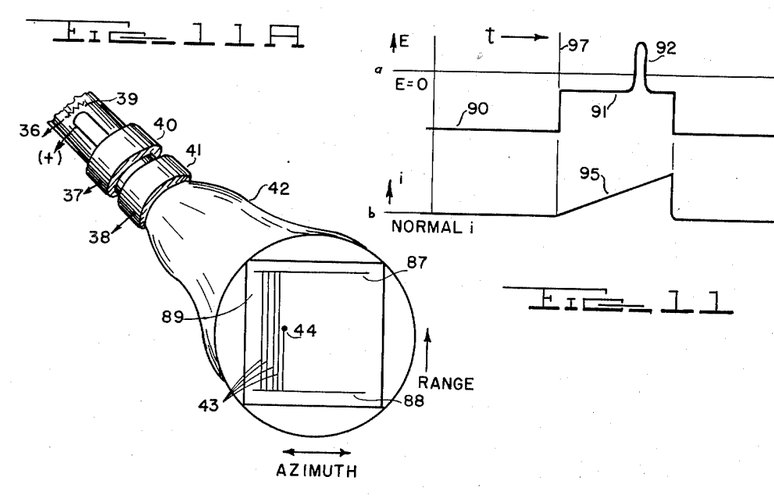

In Fig. 11a a common form of data presentation on a cathode ray tube for radar systems is illustrated.

Cathode ray tube 42 having screen 89, magnetic deflecting coils 41 and 40, and control grid 39 is arranged to present radar data describing the field of search as a plot of range versus azimuth. In the figure the "linear range sweeps" 43 may start at the bottom of the tube from along imaginary line 88 and travel upward to terminate at line 87. Each sweep will be initiated at the inception of a pulse transmitted from the radar system and will move up the tube screen at a rate and for a length of time determined by the maximum radar range desired. The successive sweeps will vary in position across the screen of the tube depending upon the azimuth position of the radar antenna. Spot 44 produced by the electron beam is shown in the process of tracing one of the linear range sweeps. Whenever an echo signal is received by the radar system from a remote reflecting object it is amplified by the receiving apparatus of the radar system and applied as an intensity modulation to the control grid of the cathode ray tube through connection 36. Such signals will cause the appearance of bright spots of light on the screen of the cathode ray tube in positions corresponding to the relative positions of reflecting objects. Fig. 11-A is a time-voltage graph showing the variations in potential on the control grid of the cathode ray tube in time relation with the existence of the repeating linear sweep. At $a$ the control grid potential is plotted and at $b$ the linear sweep current through the deflecting coil of the cathode ray tube is shown. Between sweeps the grid is biased negatively such as by an amount at 90, and with the transmission of an energy pulse in the radar system linear sweep 95 commences and at the same instant the bias potential on the grid of the cathode ray tube is diminished to 91 where it remains for the duration of the linear sweep. Hence, the electron beam in the indicator tube is biased to a point just below the point where it causes visible light on the screen such that echo signals such as at 92 will cause the production of a spot of light in a known manner. The circuit of Fig. 12 is adapted to control the electron beam movement and intensity in the manner described even for the fastest of linear sweeps.

Figure 12:
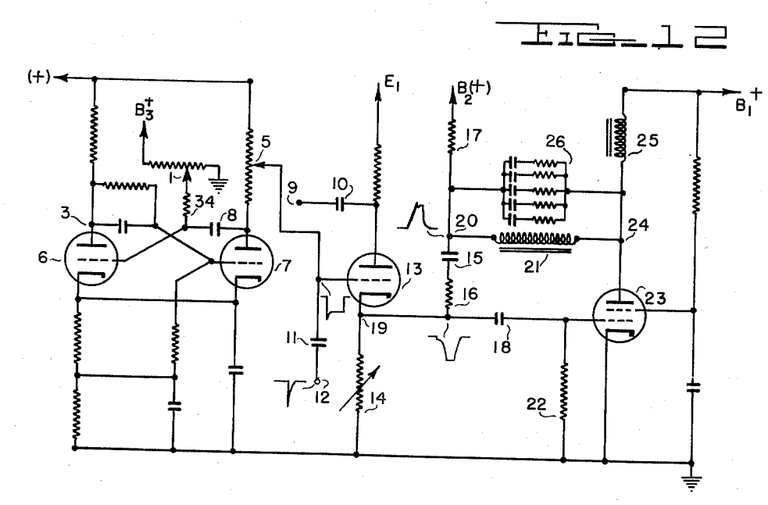
Figs. 12 and 13 illustrate special forms of the invention adapted for operating in conjunction with the apparatus of Fig. 11.

In Fig. 12 the teachings of the invention are again employed but in a slightly more complex manner than has been described in connection with the previous figures. The main elements here are a square pulse generating circuit comprising tubes 6 and 7, a switching tube 13, a sweep-generating amplifier tube 23, with additional components to be described. Upon the application of a negative trigger pulse to point 12, through condenser 11, and through condenser 8 to the grid of tube 6 a negative square pulse is produced by said pulse generating circuit. Contactor 5 of the potentiometer in the plate circuit of tube 7 is connected to the grid of tube 13 to provide a negative square pulse to said grid. Tube 13 is normally conducting a given amount which determines the normal potential at its cathode.

Inductance 21 represents the magnetic deflection coil of the cathode ray tube indicator and through which repeating linear current sweeps are desired. Damping network 26 may be a combination of resistors and condensers which are apportioned to prevent any self-oscillations which could be caused by distributed capacitance in coil 21 or elsewhere in the circuit during the sweep current through such coil. A particular network combination which seems to be satisfactory for the damping effect is one in which the resistors are all of the same value and the condensers range from relatively small values upwards to relatively large values, such that at least one branch of the combination presents a suitabe damping impedance to any oscillation frequency likely to occur in the associated circuit.

Amplifier tube 23 is preferably of the multi-grid type in which the plate current is substantially independent of plate voltage. That is, this tube preferably should be of the so-called constant current type. Condenser 15 is connected in series with resistor 16 and is employed both as the negative feedback condenser from the plate circuit to the grid circuit and as the sweep-forming condenser. The function of resistor 16 will be explained in due course. Inductance coil 25 has a large inductive reactance compared to that of coil 21. In fact, it is large enough so that the current flowing through it remains substantially constant throughout the variations in voltage and current in other portions of the circuit.

Recalling for the moment Fig. 10 and the analysis thereof, it will be noted that when the inductance coil is being driven negative (current increasing) the maximum slope of the linear sweep obtainable is determined by the magnitude of the supply voltage for the amplifier tube primarily. Hence, it is desirable there to have $R_L$ as small as possible. This condition however (small $R_L$) is incompatible to producing sawtooth sweeps of small slopes and with good linearity, since the total plate voltage variation throughout the linear sweep will be small making the amount of feedback small and impairing the linearity of the sweep. Hence, as was pointed out, where it is desired to be able to select sweeps of a range of slopes it would be most practical to vary both $R_L$ and $R_2$ such that the ratio is kept constant. In the circuit of Fig. 12 however, the magnetic deflection coil of the cathode ray tube is driven in a positive sense (current decreasing throughout the sweep), hence, the power supply voltage is no limitation on the slope of the linear sweep currents through coil 21. As will be seen, it is the induced voltage in coil 25 when the conductivity of tube 23 decreases that drives the sweep current through coil 21. Resistance 17 (corresponding to $R_L$ of Fig. 2) need not be varied to produce linear sweeps of varying slopes. It may be set at a high enough value to provide sawtooth waves of good linearity regardless of slope. The voltage drop in resistor 17 at any instant will be proportional to deflection current and hence to actual deflection of the cathode ray tube beam. Hence, for a given amplitude sweep it remains constant regardless of slope of the voltage-time variation.

In the usual case resistances 16 and 17 are considerably smaller than variable resistor 14. Resistor 22 is the grid bias resistor for tube 23. Condenser 18 functions as a D. C. blocking condenser and also to couple variations in potential at point 19 to the grid of tube 23. According to the teachings of the invention, as described in connection with Figs. 1 and 2, the effective time constant of the sweep circuit is primarily determined by the sizes of condenser 15, resistor 14, and the voltage amplification at point as shown in columns 3 and 4.

$$T = R_{14} C_{15} \cdot (A+1) \qquad (21)$$

in columns 3 and 4.

In the operation of the circuit of Fig. 12 the negative square pulse applied to the grid of tube 13 stops its flow of plate current. The potential of point 19 commences to fall immediately according to the constants of the sweep generating circuit. In the quiescent condition, before the application of the negative pulse to tube 13, tube 23 is carrying the combined current through choke coil 25 and the inductance coil 21 the latter in series with resistance 17. The average or D. C. current through coil 25 is very much greater than that through coil 21 since it has much lower D. C. resistance than coil 21 and resistance 17 in series. The initial current through the deflection coil will be the tube current less the current through coil 25. It is thus initial current through inductance coil 21 which determines the starting position of the linear sweep on the cathode ray tube screen, such current flowing in a direction from left to right in accordance with the common convention. As point 19 begins to fall in potential upon the application of the negative square pulse of tube 13, the potential at the control grid of tube 23 also commences to fall in potential at the same rate, condenser 18 presenting substantially no reactance. The current through tube 23 thus commences to decrease accordingly. Since the current through choke coil 25 remains virtually constant it follows that the current through inductance coil 21 must change with the result that the gradual lowering of the potential at the control grid of tube 23 causes an increasing portion of the current in inductance 25 to be diverted through the coil 21 and in a sense opposite to the direction of the initial curent flow through 21. As the current of coil 21 decreases the potential at point 20 (being determined by the voltage drop in resistor 17) commences to rise, which rise is fed back through condenser 15 and resistor 16 to the control grid of tube 23 in a direct manner. The success of the circuit, it may be seen, is dependent to a large extent upon the fact that the induced voltage in coil 25 has little effect upon the current flow through tube 23.

By virtue of the negative feedback through condenser 15 the non-linearity of the amplifier tube characteristics is transferred in its effect from plate to grid. Hence, the variations of potential at point 20 of the circuit, therefore the current through coil 21, will be very linear while the variations at point 19 or the grid of tube 23 will be accordingly non-linear, as the tube characteristic is non-linear.

There is another cause for non-linearity in the variations of potential at the grid of tube 23. As choke coil 25 generates a voltage for driving a linear current sweep through inductance coil 21 it will be noted that in the case of rapid sweeps especially the distributed capacitance between the windings of coil 21 must first be charged to a new potential before the linear variation in current through coil 21 will commence. In order to cause the charging of this distributed capacitance in inductance coil 21 without deterring from producing a linear sweep of current therein, which starts immediately with the shutting off of tube 23, it is desirable to impress upon the grid of tube 23 an accelerated voltage dip at the initiation of the progressive change of voltage of point 19 which produces the sweeps. This is accomplished in the circuit by the interposition of the resistor 16 between the condenser 15 and point 19. Thus, when the normal plate current of tube 13 is cut-off by the negative square pulse at the control grid thereof, the potential of point 19 changes a small amount suddenly according to the voltage dividing action of resistance 16 and resistance 14 in series. Thus, this initial "step" in voltage at the grid of tube 23 as by the voltage dividing action of resistors 16 and 14 permits the current through coil 21 to change linearly with time at the initiation of the sweep variation. Owing to the fact that the plate resistance of tube 23, although very large, is still small enough to be not entirely negligible for very rapid sweeps in coil 21 (where the induced voltage in inductance coil 25 becomes large in producing the sweep through coil 21) the negative "step" voltage produced by resistor 16 should be slightly larger than would be required were it only for its effect on "charging" the distributed capacitance in the circuit as above.

Figure 13:
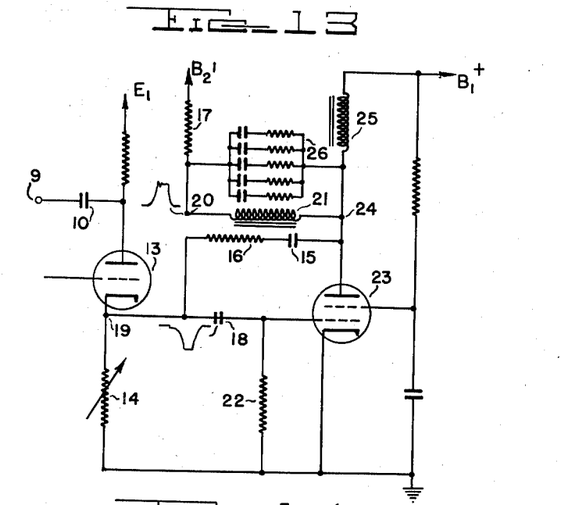

The arrangement of Fig. 12 may be altered somewhat if desired. Fig. 13 shows a modified form of the arrangement in Fig. 12 to the right of and including tube 13. Here it will be noted that condenser 15 and resistor 16 are connected from point 19 to the plate of tube 23 rather than to point 20. In the operation of this form of the circuit both components of the plate voltage are fed back from plate to grid as according to the operation of the circuit in Fig. 10. With this arrangement it is also possible to cover a wide range of sweep speeds by varying only resistor 14. Resistance 16 and condenser 15 are fixed in magnitude depending on the characteristics of the coil 21 and according to the equations relating to the circuit of Fig. 10. Resistance 16 should be considerably higher in the case of Fig. 13 than it was for the circuit of Fig. 12 to produce the same effect.

In summary, for the case of Fig. 12 on the resistance 17 voltage drop component of the plate voltage of tube 23 is fed back to the grid of tube 23, in addition to a small amount of "step" voltage. In the case of Fig. 13, however, an additional square voltage pulse is fed back from the plate to the grid of tube 23 in accordance with the generation of a trapezoidal voltage wave to produce a linear saw-tooth of current through coil 21.

It is known that there are several methods of approaching the problem of centering the sweeps on a cathode ray tube screen. For example, separate centering coils have been used to introduce a constant amplitude displacement to the electron beam, or a separate centering supply voltage may be incorporated to cause a constant centering current to flow through the one sweep deflecting coil with the sweep voltage itself being A. C. coupled into the coil. The use of a centering tube is another method.

In Figs. 12 and 13 of the present invention the centering of the sweep on the cathode ray tube is obtained as an integral function of the sweep generating circuits. The manner in which this is brought about is as follows.

Choke coil 25 presents a low impedance to the flow of direct current but has a very high reactance to the sweep currents. Inspection of Fig. 12 shows that at any instant the sum of the currents in coils 21 and 25 is equal to the current through tube 23 (it is assumed that the impedance of network 26 is high). The same relation exists for the average direct currents as exists for the instantaneous currents in coils 21, 25 and in tube 23. From this relation it will be observed that a change in the length of the linear sawtooth wave (longer or shorter in time) changes the average current through tube 23, and since it is essentially the average current through inductance coil 21 that determines the centering position of the sweeps on the cathode ray tube screen one need only control such average current to obtain centering. It will also be observed that the manner in which the average tube 23 current divides between the inductance 21 and the inductance 25 is determined by the relative D. C. resistances of these two paths of current flow and also by the relative potentials of $B_1+$ and $B_2+$. Thus, in one practical form of the circuit the values of voltages $E_1$ and $B_1$ may be the same, and since the D. C. resistance of 17 is high compared with the resistance of choke coil 25 practically all of the average current in tube 23 will flow through coil 25 making the average current through coil 21 substantially zero. Thus, the sweeps will be centered properly on the cathode ray tube screen, the average tube current being made one-half the maximum tube current.

As was just mentioned the average tube current (tube 23) is dependent upon the average conduction time of this tube and thus upon the length of the gate at the grid of tube 13. Hence, by varying the length of this gate centering may be obtained the amplitude of the linear sweep variation remaining the same. This may be accomplished by changing the time constant of the gate circuit comprising tubes 6 and 7 or by moving contactor 1 of the potentiometer connected between $B_3$ and ground.

Further, it was stated that the relative potentials of $E_1$ and $B_1$ could be varied to obtain centering control. Normally $B_1$ would be of a fixed nature since this supplies not only the plate energy for tube 23 but also the potential for the suppressor grid which should be constant over the operating range. It is thus most convenient to vary the potential at $E_1$ for centering control. With this method of control the conduction period of tube 23 need be only long enough to establish the required average current through coil 25.

To control the time duration of the linear sweep without changing its amplitude variable contactor 5 is provided which adjusts the amplitude of the negative square pulse applied to the grid of tube 13. This effect has been described.

Although not shown in the circuit of Fig. 12 a separate gate generating circuit may be employed for controlling the intensity of the cathode ray beam of the indicator tube. Such a circuit may be of the triggered square wave generating type and may be initiated by the same trigger impulse which initiates the operation of the circuit of Fig. 12 or its modification, Fig. 13. The termination of the square pulses from this separate circuit precisely at the end of each sawtooth sweep may be caused by connecting the plate terminal of tube 13 through condenser 10 to a proper control electrode of said gate circuit. The discharge of condenser 10 through tube 13 when the latter suddenly conducts at the end of each linear sweep provides the triggering impulse.

Figure 14:
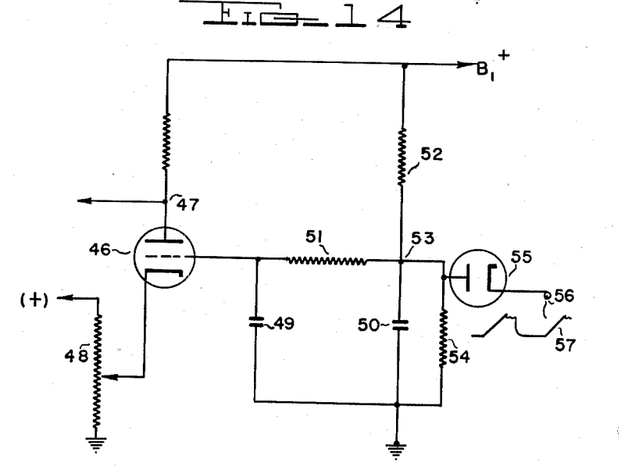
Fig. 14 is an optional addition to the circuits of Figs. 12 and 13.

Fig. 14 shows a circuit designed to cooperate with the circuits of Figs. 12 and 13 to provide means for adjusting and automatically maintaining the centering of sweeps on a cathode ray tube screen.

In Fig. 14 points 56 and 47 are connected directly to point 20 and connection 1 respectively, in the circuit of Fig. 12. The plate of tube 46 is connected to point 47 and from there through a plate load resistance to a source of positive potential. The cathode of tube 46 is connected to a source of variable potential as potentiometer 48. The plate of diode tube 55 is connected to the grid of tube 46 through resistor 51. Resistor 51 and condensers 49 and 50 constitute a filter or smoothing circuit. Point 53, connected directly to the plate of tube 55, is the junction for resistors 52 and 54 (which return to a source of positive potential and to ground respectively) the plate of diode 55 and the junction of resistor 51 and condenser 50 of the filter circuit.

Tube 46 is normally conducting an amount determined by the potential at its grid and the magnitude of the resistance in its cathode circuit. The potential at point 47, is determined by the amount of current through tube 46. The potential at connection 1 of Fig. 1, and the resultant centering of the sweep on the cathode ray tube screen is thus dependent upon the amount tube 46 conducts and hence upon the setting of potentiometer 48 and the potential on the grid of tube 46. The voltage wave form appearing at point 56 is the same as that at point 20 in Fig. 12 and is a measure of the current through the coil 21. Should the initial magnitude of current through such coil, represented by portion 57 of the voltage form, fall below a certain value, tube 55 will conduct bringing the potential of point 53 down toward that of point 56. The grid of tube 46 will become more negative and point 47 will rise in potential. This action will manifest itself in a correction of the length of the negative square pulses applied to the grid of tube 13 in Fig. 12, which results in restoration of the centering of the sweeps.

In various instances throughout the description of the drawings it will be clear that by suitable modifications inductance-resistance elements instead of capacitance-resistance elements could have been employed in the sweep generating function. This, in the majority of cases, however is a disadvantage since additional feedback means must be provided. The forms shown, although not as limitations, are most convenient applications of the teachings of the invention.

In the claims, whenever reference is made to the connection of two or more points or circuit elements the intention is to include connections through coupling condensers or direct coupling with simple conductors, unless otherwise stated. That is, coupling condensers as employed herein are for the purpose of providing D. C. isolation for various parts of the circuits. This does not refer to the feedback and sweep-forming condenser, although it also is necessarily a D. C. blocking condenser in some instances.

The description of the invention and several of its more useful applications has been an attempt to illustrate its scope. The main feature, however, lies in a method for performing the accurate integration of a varying or constant voltage or current, which may vary at a very rapid rate. Since the use of such feature most commonly will be for the generation of linear sweeps, and since the inventor has already evolved a number of precision circuits accordingly adapted the description has been centered around this phase of the teachings presented. The claims are intended to set forth the invention in its true scope regardless of the limitations in the above description.

What is claimed is:

1. Apparatus for generating a linear sweep of a high degree of linearity comprising a vacuum tube having a cathode, an anode and at least one grid, a resistor electrically connected at one end to the control grid of said vacuum tube and at the other end to a reference voltage, means including switching means connected in series with said resistor for maintaining a predetermined voltage across said resistor prior to and until the initiation of a linear sweep, said switching means being operative effectively to disconnect said last mentioned means from said resistor, a condenser connected in circuit between the said anode and the end of said resistor connected to said grid, and a load connected in circuit between said anode and a source of positive voltage.

2. Apparatus in accordance with claim 1 in which said switching means includes a vacuum tube having a control element, and means connected to said control element for impressing a negative voltage pulse thereon effectively to disconnect said resistor in a manner provided in claim 1.

3. Apparatus in accordance with claim 1 in which said switching means includes a vacuum tube having a control element and means connected to said control element for impressing a negative pulse thereto to render said tube non-conducting thereby effectively to disconnect said resistor as provided in claim 1, the amplitude of said linear sweep being limited by the amplitude of said negative pulse.

4. An electronic integrating circuit comprising, a vacuum amplifier tube having a cathode connected to a first fixed potential, a control grid connected through a resistance to a second fixed potential, an anode connected through a load resistance to a source of positive potential and connected through a condenser to said control grid, switching means connected to said control grid and arranged to electrically connect and disconnect said control grid from a reference potential, the potential at said anode being the time integration of said second fixed potential following the disconnection of said grid from said reference potential.

5. Apparatus in accordance with claim 4 in which said switching means is an electronic switching circuit operable by voltage pulses.

6. An integrating circuit comprising a vacuum tube having a cathode connected to a first fixed potential, an anode connected through a load resistance to a positive potential source, a control grid connected through a condenser to said anode and switching means connected to said control grid for connecting said grid alternately to a source of reference potential or through a resistance to a second fixed potential, such that during the time of connection to said reference potential said condenser attains a predetermined charge and immediately following the disconnection of said reference potential and the connection to said second fixed potential the potential at said anode becomes the integrated value of said second fixed potential.

7. Apparatus for driving an inductive and resistive load with a current wave which varies as the integral of a predetermined voltage wave function, which apparatus includes a vacuum tube having a cathode, an anode and at least one grid, a load as aforesaid, connected between said anode and a source of positive voltage, a resistor effectively connected at one end to said grid, means coupled to said resistor for maintaining a predetermined voltage across said resistor immediately before said voltage wave function is initiated, switching means connected to the end of said resistor connected to said grid being arranged to disconnect said end of said resistor from a source of relatively steady voltage, and a resistance-capacitance network having at least one series capacitance connected in circuit between said anode and the end of said resistor connected to said grid, said network having a time-constant approximately equal to that of said load.

8. Apparatus for generating a linear sweep comprising a first vacuum tube having at least an anode, a cathode and a control grid, a first resistor electrically connected at one end to said control grid and at the other end to a reference voltage source, means for maintaining a predetermined voltage across said first resistor prior to and until the initiation of a linear sweep, switching means connected in series with said first resistor for effectively disconnecting said last-mentioned means from said first resistor, said switching means including a second vacuum tube having at least an anode, a cathode and a control grid, said anode and said cathode of said second tube being respectively connected to a source of positive voltage and said first resistor, said control grid of said second tube being adapted to be energized by a negative voltage pulse, a condenser connected in circuit between the anode of said first tube and the end of said first resistor connected to the grid of said first tube, and a load connected in circuit between the anode of said first tube and a source of positive voltage.

9. Apparatus in accordance with claim 1, wherein said load consists of an inductance and a resistance connected in series, and wherein a second resistor is connnected in circuit in series with said condenser, the time-constant of said second resistor and said condenser being approximately equal to that of said load.

10. Apparatus for generating a linear sweep comprising an electron tube having a cathode, sistor and switching means serially connected across a potential source, means directly coupling said control grid to the junction of said first resistor and said switching means, a feedback path comprising a condenser and a second resistor connected in series between said anode and said junction, said inductance being connected in circuit between said anode and a source of positive potential, said condenser and said first resistor being proportioned to determine the slope of said sawtooth current.

20. Apparatus for driving a sawtooth current through an inductance comprising, an electron tube having at least an anode, a cathode and a control grid, a first resistor and switching means serially connected across a voltage source, means directly coupling said control grid to the junction of said first resistor and said switching means, a feedback circuit comprising a second resistor and a condenser in series connected between said anode and said control grid, said inductance being connected in series with a third resistor between said anode and a source of positive potential, the time constant of said first resistor and said condenser being approximately equal to that of the combination of said inductance and said third resistor.

21. Apparatus for driving a sawtooth current through an inductance comprising, an electron tube having at least an anode, a cathode and a control grid, a first resistor, means for establishing current flow through said first resistor, means directly coupling said control grid to one end of said first resistor, a series combination of a second resistor and a condenser connected between said anode and said control grid, and means for interrupting current flow through said resistor, said series combination and said first resistor being proportioned to produce a trapezoidal voltage at the anode of said tube during the interruption of current flow through said first resistor, said inductance being connected in series with a load resistor between said anode and a source of positive potential.

22. Apparatus for driving a sawtooth current through an inductance comprising, an electron tube having at least an anode, a cathode and a control grid, a first resistor and switching means connected in series between a positive voltage and ground potential whereby current flow is established through said first resistor, means directly coupling said control to the junction between said first resistor and said switching means, a series combination of a second resistor and a condenser connected between said anode and said control grid, said inductance being connected in series with a load resistance between said anode and a source of positive potential, said condenser and said first resistor being proportioned to determine the slope of said sawtooth current, and said second resistance being of a value to produce an initial rise in voltage at the anode of said tube at the beginning of each sawtooth.

23. An integrating circuit comprising first and second electron tubes each having at least an anode, a cathode and a control grid, a first resistor, said first resistor and said second tube being connected in series across a source of potential, one end of said first resistor being connected to a positive potential and the other end being connected to the anode of said second tube and the cathode of said second tube being connected to ground potential, a second resistor coupling the control grid of said first tube to the anode of said second tube, a condenser coupling the anode of said first tube to the anode of said second tube, the aforesaid connections maintaining a predetermined voltage across said first resistor during conduction of said second tube, a load resistance connected in circuit between the anode of said second tube and a source of positive potential, and means for applying a negative pulse of predetermined duration to the control grid of said second tube thereby rendering said second tube nonconducting, said first and second tubes being so biased that said second tube terminates the integration operation of said circuit at a time during said negative pulse when the potential at the anode of said first tube reaches a selected magnitude.

CLAYTON A. WASHBURN.

REFERENCES CITED

The following references are of record in the file of this patent:

UNITED STATES PATENTS

| Number | Name | Date |
|---|---|---|
| 2,126,243 | Busse et al. | Aug. 9, 1938 |
| 2,300,524 | Roberts | Nov. 3, 1942 |
| 2,412,063 | Rosentreter | Dec. 3, 1946 |
| 2,412,485 | Whiteley | Dec. 10, 1946 |

FOREIGN PATENTS

| Number | Country | Date |
|---|---|---|
| 528,806 | Great Britain | Nov. 7, 1940 |